United States Patent
Nguyen Van et al.

(10) Patent No.: US 12,447,949 B2
(45) Date of Patent: Oct. 21, 2025

(54) DRIVING SUPPORT DEVICE, METHOD, STORAGE MEDIUM, AND VEHICLE

(71) Applicant: TOYOTA JIDOSHA KABUSHIKI KAISHA, Toyota (JP)

(72) Inventors: Quy Hung Nguyen Van, Shizuoka-ken (JP); Shouji Itou, Mishima (JP); Akira Hattori, Shizuoka-ken (JP); Manh Dung Vu, Nagoya (JP); Sueharu Nagiri, Nagoya (JP); Hirofumi Aoki, Nagoya (JP); Tatsuya Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 394 days.

(21) Appl. No.: 17/938,065

(22) Filed: Oct. 5, 2022

(65) Prior Publication Data
US 2023/0106686 A1 Apr. 6, 2023

(30) Foreign Application Priority Data
Oct. 6, 2021 (JP) .................. 2021-165036

(51) Int. Cl.
*B60W 30/09* (2012.01)

(52) U.S. Cl.
CPC ....... *B60W 30/09* (2013.01); *B60W 2554/802* (2020.02); *B60W 2554/804* (2020.02)

(58) Field of Classification Search
CPC ........... B60W 30/09; B60W 2554/802; B60W 2554/804; B60W 40/09; B60W 50/14; B60W 30/18163; B60W 2520/10; B60W 2554/4026; B60W 2554/4029; B60W 2554/4042; B60W 2554/801; B60W 2556/10; B60W 2720/10; B60W 2754/20
See application file for complete search history.

(56) References Cited

U.S. PATENT DOCUMENTS

| | | | |
|---|---|---|---|
| 6,363,632 B1 * | 4/2002 | Stentz .................. | E02F 9/24 701/50 |
| 2017/0287186 A1 * | 10/2017 | Saito .................. | G06T 11/60 |
| 2023/0104334 A1 * | 4/2023 | Ota .................. | B60W 50/0097 701/301 |
| 2024/0233545 A1 * | 7/2024 | Takebayashi ............ | G08G 1/16 |

FOREIGN PATENT DOCUMENTS

JP 2015130069 A 7/2015

* cited by examiner

*Primary Examiner* — Ramya P Burgess
*Assistant Examiner* — Ana D Thomas
(74) *Attorney, Agent, or Firm* — Dickinson Wright, PLLC

(57) ABSTRACT

A driving support device for a vehicle includes: a calculation unit that calculates a sensitivity index value for avoiding a target that is at risk of collision, based on a driving operation content of a driver of the vehicle; a determination unit that determines a driving support method to be applied to the driver, based on the sensitivity index value calculated by the calculation unit; and an execution unit that executes the driving support method determined by the determination unit.

6 Claims, 4 Drawing Sheets

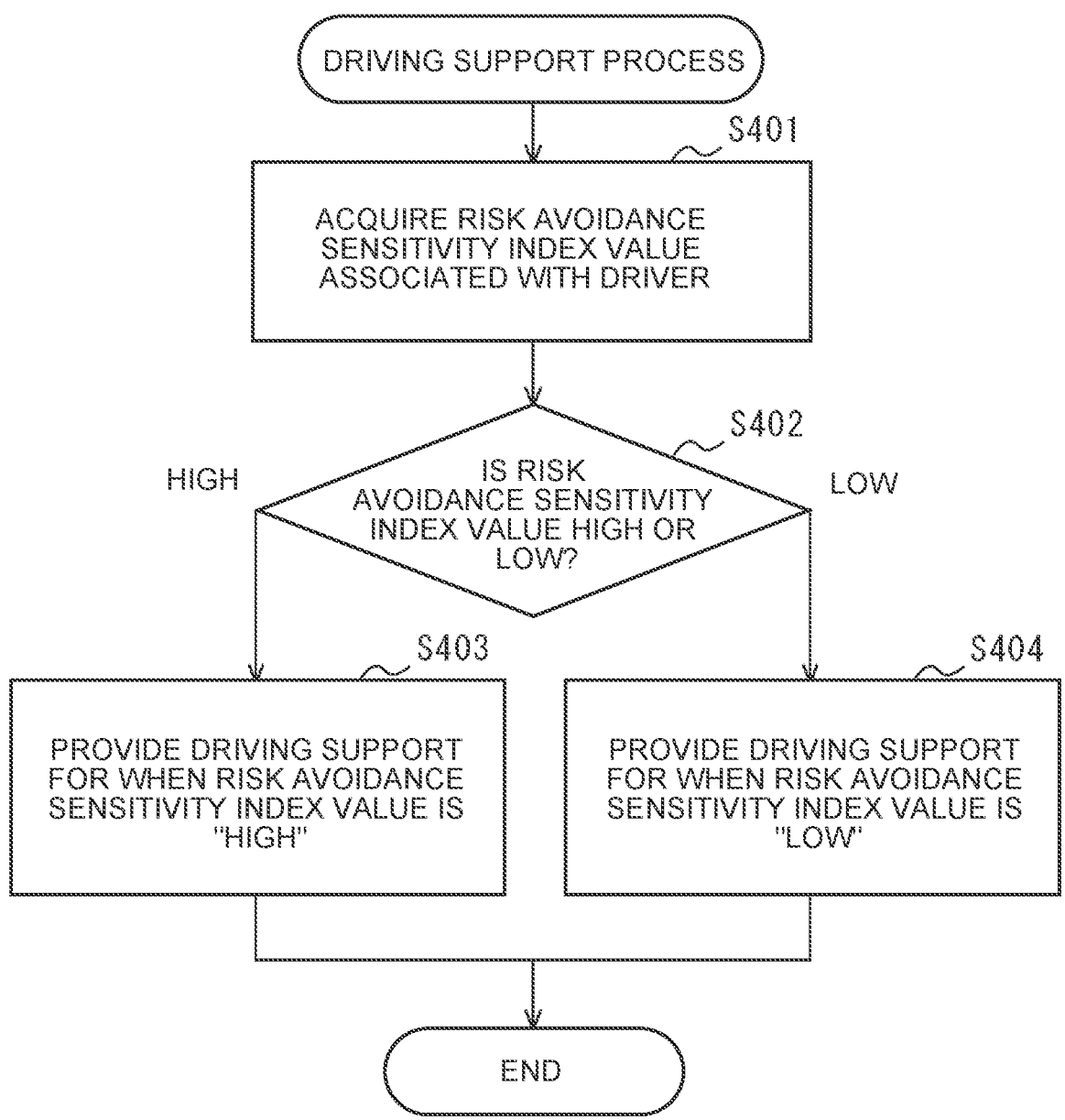

FIG. 5

| | RISK AVOIDANCE SENSITIVITY INDEX VALUE | |
| --- | --- | --- |
| | HIGH | LOW |
| SUPPORT METHOD | SUPPORT CENTERED ON LATERAL DISTANCE WHEN PASSING RISK TARGET (SUPPORT CENTERED ON STEERING) | SUPPORT CENTERED ON SPEED WHEN PASSING RISK TARGET (SUPPORT CENTERED ON DECELERATION) |
| TARGET VALUE OF AMOUNT OF SUPPORT — LATERAL DISTANCE WHEN PASSING RISK TARGET | SUPPORT IN LATERAL DISTANCE IN ACCORDANCE WITH TYPE OF RISK TARGET (VARIABLE TARGET LATERAL DISTANCE)<br><TYPE><br>- CHILD PEDESTRIAN<br>- ADULT PEDESTRIAN<br>- BICYCLE | SUPPORT IN CONSTANT LATERAL DISTANCE CONCERNING SAFETY REGARDLESS OF TYPE OF RISK TARGET (FIXED TARGET LATERAL DISTANCE) |
| TARGET VALUE OF AMOUNT OF SUPPORT — SPEED WHEN PASSING RISK TARGET | DECELERATION SUPPORT UNTIL CONSTANT PASSING SPEED CONCERNING SAFETY REGARDLESS OF TYPE OF ROAD (FIXED TARGET PASSING SPEED) | DECELERATION SUPPORT UNTIL PASSING SPEED IN ACCORDANCE WITH TYPE OF ROAD (VARIABLE TARGET PASSING SPEED)<br><TYPE><br>- PRESENCE/ABSENCE OF CENTRAL SEPARATION LINE<br>- SIZE OF ROAD WIDTH |
| TIMING OF SUPPORT | START STEERING CONTROL EARLY (STEER-FIRST) | START DECELERATION CONTROL EARLY (BRAKE-FIRST) |
| HMI (SUPPORT MODE NOTIFICATION) | NOTIFY STEERING INTERVENTION SUPPORT EARLY<br>- DISPLAY NOTIFICATION (INSTRUMENT PANEL, HUD)<br>- VOICE NOTIFICATION<br>- HAPTIC NOTIFICATION (VIBRATE STEERING WHEEL) | NOTIFY BRAKE INTERVENTION SUPPORT EARLY<br>- DISPLAY NOTIFICATION (INSTRUMENT PANEL, HUD)<br>- VOICE NOTIFICATION<br>- HAPTIC NOTIFICATION (VIBRATE ACCELERATOR PEDAL) |

DRIVING SUPPORT DEVICE, METHOD, STORAGE MEDIUM, AND VEHICLE

CROSS-REFERENCE TO RELATED APPLICATION

This application claims priority to Japanese Patent Application No. 2021-165036 filed on Oct. 6, 2021, incorporated herein by reference in its entirety.

BACKGROUND

1. Technical Field

The present disclosure relates to a driving support device mounted on a vehicle and providing driving support for avoiding a collision between a vehicle and a target.

2. Description of Related Art

Japanese Unexamined Patent Application Publication No. 2015-130069 (JP 2015-130069 A) discloses a driving support device that determines the timing of providing support for avoiding a collision between a target existing ahead of a vehicle (pedestrians, bicycles, parked vehicles, telegraph pillars, etc.) and the vehicle, in accordance with the lateral distance and the margin clearance based on the tendency of the driving operation of the driver of the vehicle.

SUMMARY

In driving support technologies for avoiding the vehicle from coming into contact with a moving target such as a pedestrian or a bicycle, it is required to provide support that is appropriate for the driver in accordance with the driving characteristics of the driver.

The present disclosure has been made in view of the above issues, and an object of the present disclosure is to provide a driving support device or the like capable of providing appropriate content of driving support in accordance with the driving characteristics of a driver of a vehicle.

In order to solve the above issues, an aspect of the disclosed technology is a driving support device for a vehicle including: a calculation unit that calculates a sensitivity index value for avoiding a target that is at risk of collision, based on a driving operation content of a driver of the vehicle; a determination unit that determines a driving support method to be applied to the driver, based on the sensitivity index value calculated by the calculation unit; and an execution unit that executes the driving support method determined by the determination unit.

The driving support device or the like of the present disclosure can provide appropriate content of driving support in accordance with the driving characteristics of a driver of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart of a driving support process executed by the driving support device; and FIG. 5 is an example of driving support content based on a risk avoidance sensitivity index value (iPRE value).

DETAILED DESCRIPTION OF EMBODIMENTS

A driving support device of the present disclosure provides steering support and deceleration support based on the sense of speed and the sense of distance that have been learned about a driver of a vehicle, when the vehicle overtakes a pedestrian or the like in a situation where the pedestrian or the like passing by the roadside such as a roadside zone exists in the traveling direction of the vehicle. This makes it possible to provide driving support that is appropriate for the driving characteristics of the driver of the vehicle and that prioritizes safety.

Hereinafter, an embodiment of the present disclosure will be described in detail with reference to the drawings.

EMBODIMENT

Configuration

Figure 1:
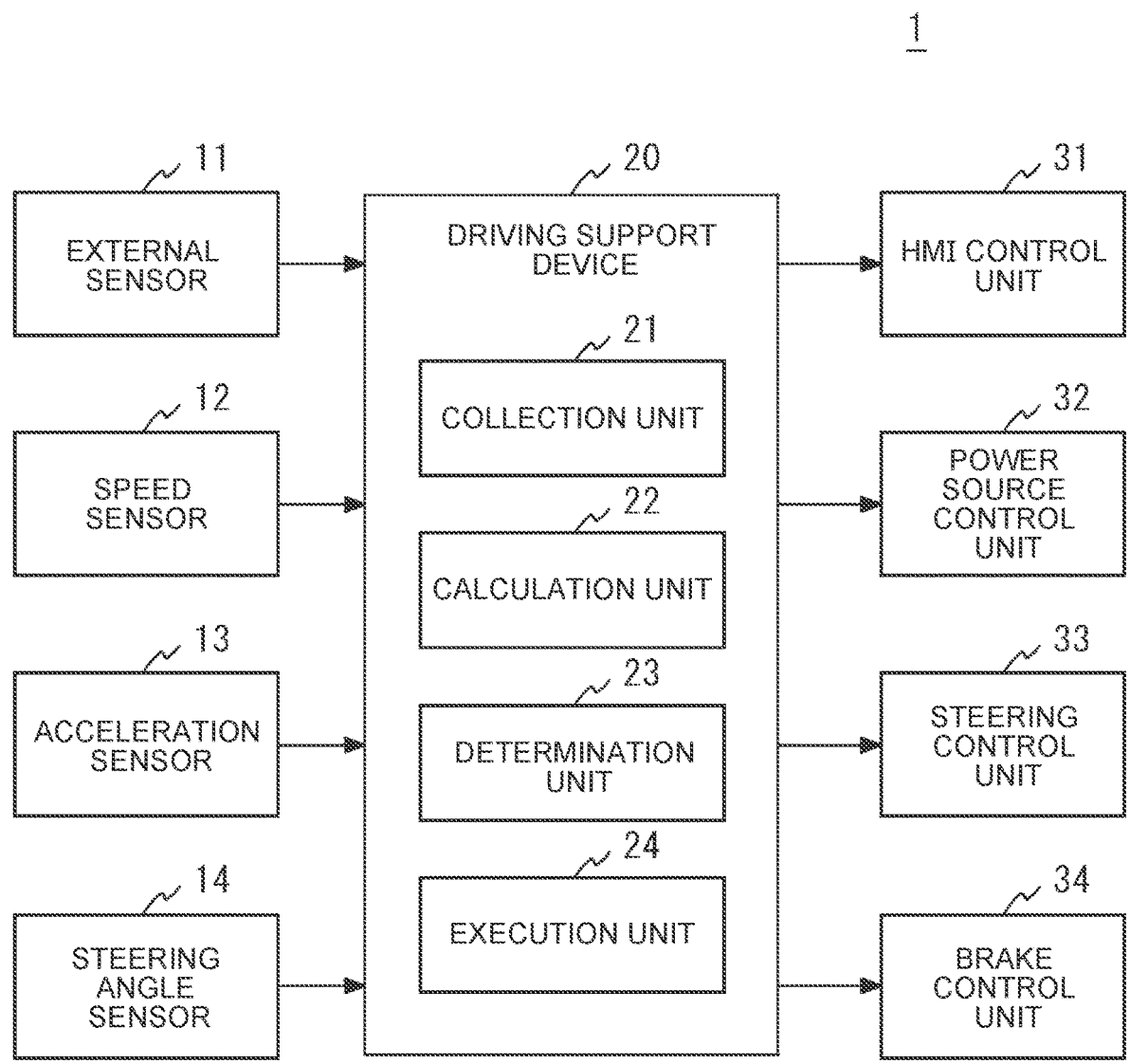
FIG. 1 is a schematic configuration diagram of a vehicle system including a driving support device according to the present embodiment.

FIG. 1 is a diagram showing a schematic configuration of a vehicle system 1 including a driving support device 20 according to an embodiment of the present disclosure. The vehicle system 1 illustrated in FIG. 1 includes an external sensor 11, a speed sensor 12, an acceleration sensor 13, a steering angle sensor 14, a driving support device 20, a human-machine interface (HMI) control unit 31, a power source control unit 32, a steering control unit 33, and a brake control unit 34. The vehicle system 1 can be mounted on a vehicle such as an automobile.

The external sensor 11 is a sensor for detecting/acquiring information about the outside of the vehicle. Specifically, the external sensor 11 is installed in the front part of the vehicle and detects targets such as pedestrians and bicycles referred to as vulnerable road users (VRU) that mainly exist ahead of the vehicle periphery to acquire information on the detected targets (type, speed, distance, etc.). The external sensor 11 also acquires information on the road on which the vehicle travels (presence/absence of a central separation line, road width, etc.). As the external sensor 11, for example, a radar sensor using lasers, millimeter waves, microwaves, or ultrasonic waves, a camera sensor using a charge coupled device (CCD) or a complementary metal oxide semiconductor (CMOS), or the like can be used. Information about the outside of the vehicle (information on the target, information on the traveling road, etc.) that has been detected/acquired by the external sensor 11 is output to the driving support device 20.

The speed sensor 12 is a sensor for detecting/acquiring the speed of the vehicle. As the speed sensor 12, for example, a wheel speed sensor for detecting the rotation speed (or rotation amount) of the wheels, which is installed on each wheel of the vehicle, can be used. The speed of the vehicle detected/acquired by the speed sensor 12 is output to the driving support device 20 as information on the vehicle.

The acceleration sensor 13 is a sensor for detecting/acquiring the magnitude of the acceleration G applied to the vehicle. For example, a three-axis accelerometer installed at a predetermined position of the vehicle to detect accelerations in the front-rear direction, the vehicle width direction, and the up-down direction of the vehicle can be used as the acceleration sensor 13. The information on acceleration detected/acquired by the acceleration sensor 13 is output to the driving support device 20 as information on the vehicle.

The steering angle sensor 14 is a sensor for detecting/acquiring the steering angle of the steering wheel based on the steering operation of the driver of the vehicle. The steering angle sensor 14 is installed, for example, in the steering control unit 33 of the vehicle. The information on the steering angle detected/acquired by the steering angle sensor 14 is output to the driving support device 20 as information on the vehicle.

The HMI control unit 31 is means capable of controlling the presentation of information such as the operating state of driving support to the driver of the vehicle in accordance with the instruction output from the driving support device 20. Various devices (not shown) such as head-up displays (HUDs), navigation system monitors, instrument panels, and speakers are used for presenting information.

The power source control unit 32 is means capable of controlling actuators (not shown) serving as power sources of the vehicle such as an internal combustion engine or a traveling motor in accordance with instructions output from the driving support device 20 to control the driving force and the braking force to be generated by each of these power sources.

The steering control unit 33 is means capable of controlling a force for assisting the steering of the vehicle by, for example, an electric power steering mechanism (not shown) in accordance with an instruction output from the driving support device 20.

The brake control unit 34 is means capable of controlling the braking force generated on the wheels via the brake device of the vehicle, for example, by an electric brake mechanism (not shown) in accordance with an instruction output from the driving support device 20.

Based on the information on the vehicle and the information on the outside of the vehicle (information on targets, information on the traveling road, etc.) obtained from the external sensor 11, the speed sensor 12, the acceleration sensor 13, the steering angle sensor 14, and the like, the driving support device 20 gives control instructions to the HMI control unit 31, the power source control unit 32, the steering control unit 33, and the brake control unit 34 to provide suitable driving support to the driver of the vehicle.

The driving support device 20 may typically be configured as a part or all of an electronic control unit (ECU) including a processor, a memory, an input/output interface, and the like. The driving support device 20 of the present embodiment realizes the functions of a collection unit 21, a calculation unit 22, a determination unit 23, and an execution unit 24 described below when a processor reads and executes a program stored in the memory.

The collection unit 21 collects traveling data including the information on the vehicle and the information on the outside of the vehicle (information on the target, information on the traveling road, etc.) that are necessary for the driving support from the external sensor 11, the speed sensor 12, the acceleration sensor 13, the steering angle sensor 14, and the like. The details of the traveling data will be described later. The calculation unit 22 learns the driving operation contents (driving characteristics, driving senses) of the driver of the vehicle, and calculates a risk avoidance sensitivity index (improved perceptual risk estimate (iPRE)) in which the learning result is incorporated. The risk avoidance sensitivity index (iPRE) is a numerical value of the characteristics of the driving operations that can be taken by the driver to avoid contact with the target at risk of collision with a vehicle when the vehicle approaches the target and passes by the side of the target. The details of the risk avoidance sensitivity index (iPRE) will be described later. The determination unit 23 determines the content (driving support method) of the driving support appropriate for the driver of the vehicle based on the risk avoidance sensitivity index (iPRE) calculated by the calculation unit 22. The determined content of the driving support is suitable for the driver's senses. The details of the method of determining the driving support content will be described later. The execution unit 24 supports the driving of the driver of the vehicle in accordance with the content of the driving support determined by the determination unit 23.

Control

Next, the processes executed by the driving support device 20 according to the present embodiment will be described with reference to FIGS. 2 to 5. The processes executed by the driving support device 20 include a data collection learning process and a driving support process.

(1) Data Collection Learning Process

Figure 2:
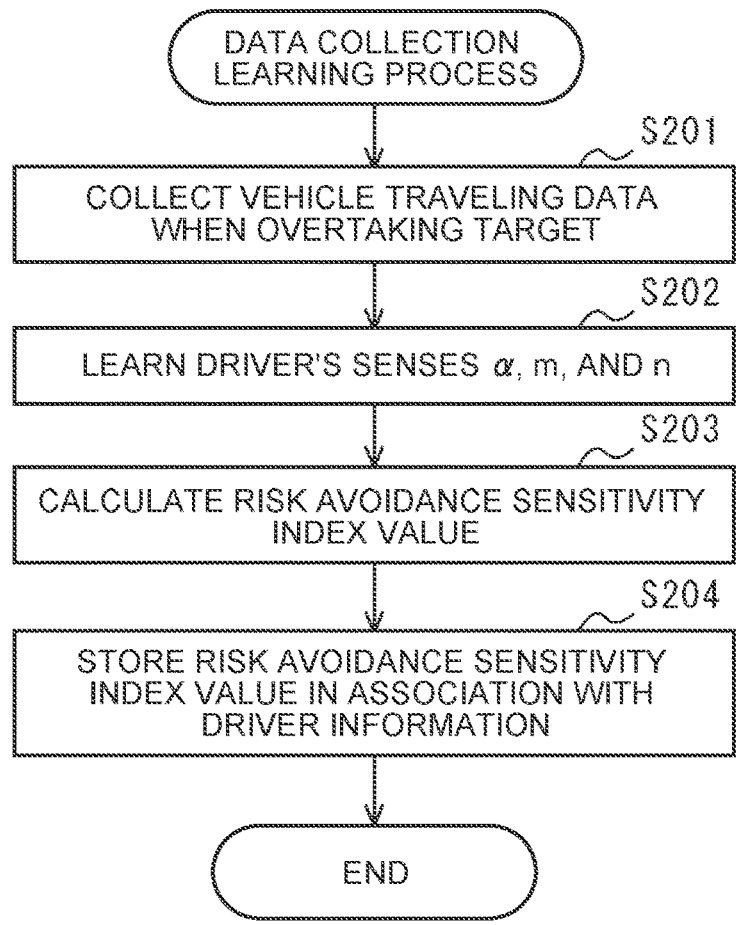
FIG. 2 is a flowchart of a data collection learning process executed by the driving support device.

FIG. 2 is a flowchart illustrating a procedure of the data collection learning process executed by the collection unit 21 and the calculation unit 22 of the driving support device 20. The data collection learning process illustrated in FIG. 2 is executed, for example, when a target (VRU) such as a pedestrian or a bicycle subject to a collision risk is detected in a place where there is a risk of protruding into the roadway such as a roadside zone or a sidewalk without a guardrail in the traveling direction of the vehicle.

Step S201

Figure 3:
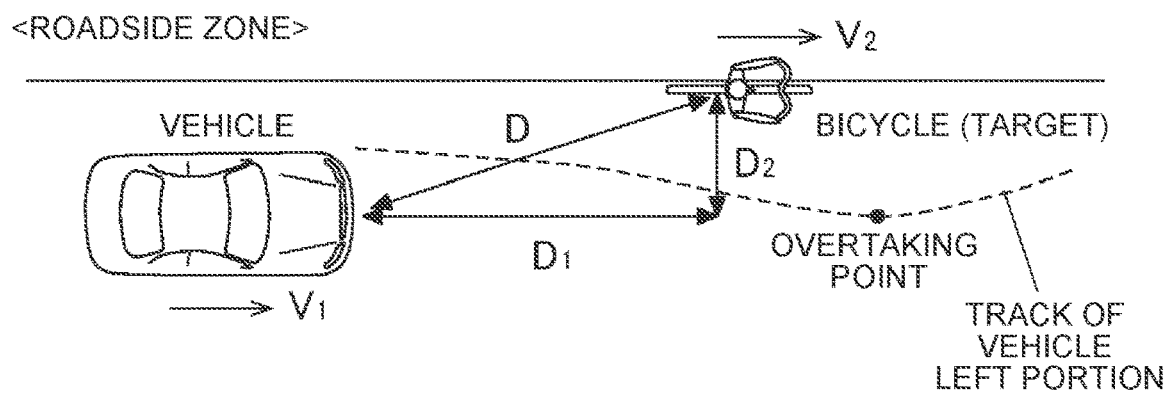
FIG. 3 is a diagram showing an example of the relationship between distance and speed of a bicycle and a vehicle.

The collection unit 21 of the driving support device 20 collects traveling data when the vehicle overtakes the target (VRU). The traveling data to be collected includes at least the vehicle speed $V_1$, the target speed $V_2$, the front-rear distance $D_1$ between the vehicle and the target (longitudinal gap between the vehicle and the VRU), and the lateral distance $D_2$ between the vehicle and the target (lateral gap between the vehicle and the VRU). FIG. 3 is a diagram showing an example of the relationship between distance and speed of a vehicle traveling on a roadway and a bicycle (target) moving on a roadside zone in the same direction as the vehicle (the situation of a vehicle (at a velocity $V_1$) before overtaking a cyclist who is moving (at a velocity $V_2$) on the shoulder in the same direction). As an example, the timing and the number of times for collecting the traveling data can be a plurality of times at predetermined intervals (a constant time interval, a constant distance interval, etc.) within the period from when the distance between the vehicle and the target becomes close to a predetermined first distance (front-rear distance $D_1$ or relative distance D) until the vehicle travels away from the target by a predetermined second distance (front-rear distance $D_1$ or relative distance D) after the vehicle overtakes the target. When the traveling data at the time of overtaking the target is collected, the process proceeds to step S202.

Step S202

The calculation unit 22 of the driving support device 20 learns the driving operation content (driving characteristics, driving senses) of the driver of the vehicle by using the traveling data of overtaking the target that has been collected by the collection unit 21. The calculation unit 22 of the present embodiment learns the driver's speed sense α (parameter of speed perception) and the driver's senses m and n (parameter of distance estimation) for predicting the front-rear distance and the lateral distance. The driver's speed sense α is considered to be a parameter expressing the difference between the driver's sense of the speed of the vehicle and the target and the actual speed of the vehicle and the target. The driver's sense m for predicting the front-rear distance is considered to be a parameter expressing the difference between the driver's estimation of the front-rear distance between the vehicle the target and the actual front-rear distance between the vehicle and the target. The driver's sense n for predicting the lateral distance is considered to be a parameter expressing the difference between the driver's estimation of the lateral distance between the vehicle the target and the actual lateral distance between the vehicle and the target. Learning of these parameters is performed as follows using the risk avoidance sensitivity index (iPRE) of the driver of the vehicle.

The risk avoidance sensitivity index (iPRE) is represented by the following first equation based on the vehicle speed $V_1$, the bicycle speed $V_2$, the front-rear distance $D_1$ between the vehicle and the bicycle (target), and the lateral distance $D_2$ between the vehicle and the bicycle.

[First Equation]

$$iPRE = \frac{Vr_a + \text{sign} \times \alpha \times V_1}{\sqrt{(D_{1a}^m)^2 + (D_{2a}^n)^2}} \qquad \text{[Equation 1]}$$

In the above first equation, the value $Vr_a$ (actual relative velocity between the vehicle and the VRU) is the actual relative speed ($Vr_a = V_2 - V_1$) of the bicycle (target) at the actual speed $V_2$ as seen from the vehicle at the actual speed $V_1$. The value sign (parameter of speed perception) is a speed sensory parameter (sign=+1 during deceleration, sign=−1 during acceleration) that is positive when the vehicle decelerates and is negative when the vehicle accelerates. The value $D_{1a}$ (actual longitudinal gap between the vehicle and the VRU) is an actually measured value (actual distance) of the front-rear distance $D_1$ between the vehicle and the bicycle, and by raising the value $D_{1a}$ to the power of the driver's sense m, the approaching sense in the front-rear direction that is perceived by the driver is estimated. The value $D_{2a}$ (actual lateral gap between the vehicle and the VRU) is an actually measured value (actual distance) of the lateral distance $D_2$ between the vehicle and the bicycle, and by raising the value $D_{2a}$ to the power of the driver's sense n, the approaching sense in the lateral direction that is perceived by the driver is estimated.

The calculation unit 22 calculates the value of the risk avoidance sensitivity index (iPRE) by applying the driver's speed sense α and the driver's senses m and n for predicting the front-rear distance and the lateral distance, which have been learned by the previous travel, to the plurality of traveling data collected in step S201. If the values of the driver's speed senses α, m, and n have not been learned yet, such as when overtaking a target for the first time, default values are used for each value. The calculation unit 22 then extracts the maximum value max (iPRE) and the minimum value min (iPRE) from the plurality of calculated risk avoidance sensitivity index values (iPRE values), and derives the driver's speed senses α, m, and n in which the difference value J between the maximum value max (iPRE) and the minimum value min (iPRE) shown in the following second equation is minimized.

[Second Equation]

$$J = \max(iPRE) - \min(iPRE) \qquad \text{[Equation 2]}$$

The calculation unit 22 updates the new values of the driver's speed senses α, m, and n derived by the calculation as learned values. When the values of the driver's speed senses α, m, and n are learned, the process proceeds to step S203.

Step S203

The calculation unit 22 of the driving support device 20 uses the value of the driver's speed sense α and the values of the driver's senses m and n for predicting the front-rear distance and the lateral distance, which have been learned and updated in step S202, to calculate the risk avoidance sensitivity index value (iPRE value) again based on the above first equation. When the risk avoidance sensitivity index value (iPRE value) is calculated, the process proceeds to step S204.

Step S204

The calculation unit 22 of the driving support device 20 stores, in a predetermined memory or the like provided in the driving support device 20, the risk avoidance sensitivity index value (iPRE value) that has been newly calculated in step S203 in association with the information of the driver of the vehicle that has overtaken the bicycle (target) in the current driving. The individual driver of the vehicle can be identified by using a well-known determination method such as, for example, determination by the unique ID of the electronic key carried by the driver, determination by the adjusted driving (seat) position, determination by image analysis using the driver camera, and the like. When the risk avoidance sensitivity index value (iPRE value) is stored in association with the driver information that can identify the individual, this data collection learning process ends.

(2) Driving Support Process

FIG. 4 is a flowchart illustrating a procedure of the driving support process executed by the determination unit 23 and the execution unit 24 of the driving support device 20. The driving support process illustrated in FIG. 4 is executed, for example, when a target (VRU) such as a pedestrian or a bicycle subject to a collision risk is detected in a place where there is a risk of protruding into the roadway such as a roadside zone or a sidewalk without a guardrail in the traveling direction of the vehicle.

Step S401

The determination unit 23 of the driving support device 20 acquires the risk avoidance sensitivity index value (iPRE value) stored in association with the information of the driver from a predetermined memory or the like. The identification of the individual driver of the vehicle is as described above. In a situation where the driver does not change during one trip from ignition on (IG-ON) to ignition off (IG-OFF) of the vehicle, each time the risk avoidance sensitivity index value (iPRE value) is calculated in step S203 of the data collection learning process described above, the newly calculated risk avoidance sensitivity index value (iPRE value) is acquired in the next target avoidance action. When the risk avoidance sensitivity index value (iPRE value) associated with the driver is acquired, the process proceeds to step S402.

Step S402

The determination unit 23 of the driving support device 20 determines whether the risk avoidance sensitivity index value (iPRE value) acquired in step S401 is high or low. As an example, the determination unit 23 can determine whether the risk avoidance sensitivity index value (iPRE value) is high or low depending on whether the risk avoidance sensitivity index value (iPRE value) exceeds a predetermined threshold value. The threshold value can be appropriately set based on statistical results of driving data obtained from a large number of drivers. When the risk avoidance sensitivity index value (iPRE value) is "high" (S402: high), the process proceeds to step S403, and when the risk avoidance sensitivity index value (iPRE value) is "low" (S402: low), the process proceeds to S404.

Step S403

The execution unit 24 of the driving support device 20 provides the driver of the vehicle with driving support for when the risk avoidance sensitivity index value (iPRE value) is "high". The content of the driving support for when the risk avoidance sensitivity index value (iPRE value) is "high" is illustrated in the left column of FIG. 5.

In the present embodiment, when the risk avoidance sensitivity index value (iPRE value) is "high", support is provided centered on the distance in the lateral direction (lateral distance) between the vehicle and the target when the vehicle passes the target. More specifically, steering support centered on the rotation of steering using the steering control unit 33 is provided. As the target value of the amount of support, regarding the lateral distance between the target at risk of collision with the vehicle (hereinafter referred to as "risk target") and the vehicle, the target lateral distance is changed in accordance with the type of the risk target (variable target lateral distance). Examples of the type of the risk target include child pedestrians, adult pedestrians, and bicycles (children and adults may be distinguished), and the target lateral distance may be maximized in the case of child pedestrians, whereas the target lateral distance may be minimized in the case of bicycles. As the target value of the amount of support, the speed of the vehicle when passing by the risk target, which is the target, is a constant speed that is fixedly set based on safety standards regardless of the type of road (fixed target passing speed). As for the timing of the support, the steering control (lateral distance support) of the steering is started at an earlier timing than when the risk avoidance sensitivity index value (iPRE value) is not high. The start of the steering control (lateral distance support) by this steering intervention is notified to the driver of the vehicle at an early stage by, for example, a display notification via an instrument panel, a head-up display (HUD), or the like using the HMI control unit 31, a voice notification via a speaker or the like, and/or a haptic notification by vibrating the steering wheel using the steering control unit 33 or the like. When the driving support for when the risk avoidance sensitivity index value (iPRE value) is "high" is provided, this driving support process ends.

Step S404

The execution unit 24 of the driving support device 20 provides the driver of the vehicle with driving support for when the risk avoidance sensitivity index value (iPRE value) is "low". The content of the driving support for when the risk avoidance sensitivity index value (iPRE value) is "low" is illustrated in the right column of FIG. 5.

In the present embodiment, when the risk avoidance sensitivity index value (iPRE value) is "low", support is provided centered on the speed of the vehicle (passing speed) when the vehicle passes by the target. More specifically, the power source control unit 32 and the brake control unit 34 are used to provide deceleration support centered on opening and closing the throttle valves of the accelerator pedal and the brake pedal. As the target value of the amount of support, the lateral distance between the risk target that is the target to be passed and the vehicle is a constant lateral distance that is fixedly set based on safety standards regardless of the type of the risk target (fixed target lateral distance). As the target value of the amount of support, regarding the passing speed of the vehicle when passing by the risk target, which is the target, the target speed is changed in accordance with the type of road (variable target passing speed). Examples of the type of the road include the presence/absence of a central separation line and the size of the road width, and for example, a higher passing speed may be set for roads with a central separation line than roads without a central separation line, and a higher passing speed may be set for roads with a wide road width than roads with a narrow road width. As for the timing of the support, the deceleration control (passing speed support) by the brake (and further the accelerator) is started at an earlier timing than when the risk avoidance sensitivity index value (iPRE value) is not low. The start of the deceleration control (passing speed support) by this brake intervention (and further this accelerator intervention) is notified to the driver of the vehicle at an early stage by, for example, a display notification via an instrument panel, an HUD, or the like using the HMI control unit 31, a voice notification via a speaker or the like, and/or a haptic notification by vibrating the accelerator pedal using the power source control unit 32 (and/or by vibrating the brake pedal using the brake control unit 34). When the driving support for when the risk avoidance sensitivity index value (iPRE value) is "low" is provided, this driving support process ends.

With the data collection learning process (steps S201 to S204) and the driving support process (steps S401 to S404) described above, it is possible to realize providing driving support based on contents that prioritize safety and that are suitable to the driving characteristics of the driver of the vehicle.

Application Example

The target value of the amount of support when the above-described risk avoidance sensitivity index value (iPRE value) is "high" or "low" may be changed depending on the presence/absence of an oncoming vehicle. For example, when there is no oncoming vehicle (No) or when the oncoming vehicle that is approaching is far from the own vehicle (Far), support may be provided based on the target value of each amount of support described above, whereas when the oncoming vehicle that is approaching is close to the own vehicle (Near), the target value of each amount of support described above may be limited (by slowing down the passing speed or the like).

Further, the target value of each amount of support when the above-described risk avoidance sensitivity index value (iPRE value) is "high" and "low" may be changed depending on whether the place where the target that is the risk target moves is a roadside zone having no level difference with the roadway surface or a sidewalk having a level difference with the roadway surface. For example, when the target is moving on a roadside zone having no level difference with the roadway surface, the support may be provided based on the target value of each amount of support described above, whereas when the target is moving on a sidewalk having a level difference with the roadway surface, the target value of each amount of support described above may be relaxed (by slightly reducing the lateral distance, by slightly increasing the passing speed, or the like).

Further, in the present embodiment, an example in which the driving support content based on the risk avoidance sensitivity index value (iPRE value) is divided into two categories, namely, "high" and "low", has been described. However, in addition to this categorization example, the driving support content may be categorized into three or more categories based on the difference in the driving type of the driver obtained by learning the driver's sense, for example.

Operations and Effects

As described above, with the driving support device according to the embodiment of the present disclosure, in a situation where a target (VRU) such as a pedestrian or a bicycle to be overtaken exists on a roadside zone or the like in the traveling direction of the vehicle, the front-rear distance between the vehicle and the target, the lateral distance between the vehicle and the target, the speed of the vehicle, and the speed of the target when the vehicle overtakes the target are sensed and learned. Based on the values obtained by this learning, the senses of the distance and the speed held by the driver with respect to the actual distance and the actual speed are estimated, and the risk avoidance sensitivity index value (iPRE value) unique to the driver of the vehicle is calculated.

By supporting the driver's driving operation using the risk avoidance sensitivity index value (iPRE value) calculated in this way, driving support that prioritizes safety and that is suitable to the driving characteristics (driving senses) of the driver of the vehicle can be provided. This makes it possible to suppress the driver from feeling anxious or annoyed by the conventional uniform driving support and to suppress a decrease in the acceptability of the driving support function by the driver.

Although the embodiment of the present disclosure has been described above, the present disclosure can be applied to a driving support device, a method executed by a driving support device including a processor and a memory, a control program for executing this method, a computer-readable non-transitory storage medium that stores a control program, and a vehicle equipped with a driving support device.

The driving support device and the like of the present disclosure can be used for vehicles and the like, and are useful when it is desired to provide driving support suitable to the driving characteristics of the driver of the vehicle.

What is claimed is:

1. A driving support device for a vehicle, the driving support device comprising:
a processor configured to execute non-transitory program instructions stored in a memory to:
calculate a sensitivity index value for avoiding a target that is at risk of collision, based on a driving operation content of a driver of the vehicle;
determine a driving support method to be applied to the vehicle as support that is provided to control the distance in the lateral direction between the vehicle and the target when the vehicle passes the target, in a case where the sensitivity index value calculated by the processor is higher than a predetermined threshold, or as support that is provided to control the speed of the vehicle when the vehicle passes by the target in a case where the sensitivity index value is lower than the predetermined threshold; and
execute the support to control the distance in the lateral direction or the support to control the speed of the vehicle determined by the processor;
wherein the processor calculates the sensitivity index value of the driver based on a distance between the vehicle and the target in a front-rear direction, a sense of the driver regarding the distance in the front-rear direction, a distance between the vehicle and the target in a lateral direction, a sense of the driver regarding the distance in the lateral direction, a speed of the vehicle, a speed of the target, and a sense of the driver regarding the speed.

2. The driving support device according to claim 1, wherein a value learned in actual travel of the vehicle is used for the sense of the driver.

3. The driving support device according to claim 2, wherein the processor executes further instructions to set, in accordance with the following first equation, the sensitivity index value iPRE of the driver based on an actual distance $D_{1a}$ between the vehicle and the target in the front-rear direction, a sense m of the driver regarding the distance in the front-rear direction, an actual distance $D_{2a}$ between the vehicle and the target in the lateral direction, a sense n of the driver regarding the distance in the lateral direction, an actual relative speed $Vr_a$ between the vehicle and the target, a sense α of the driver regarding the speed, and a speed sense parameter sign.

[First Equation]

$$iPRE = \frac{Vr_a + \text{sign} \times \alpha \times V_1}{\sqrt{(D_{1a}^m)^2 + (D_{2a}^n)^2}}. \quad \text{[Equation 1]}$$

4. A method executed by a computer in a driving support device for a vehicle, the method comprising:
calculating a sensitivity index value for avoiding a target that is at risk of collision based on a driving operation content of a driver of the vehicle;
determining a driving support method to be applied to the vehicle as support that is provided to control the distance in the lateral direction between the vehicle and the target when the vehicle passes the target, in a case where the sensitivity index value calculated by the processor is higher than a predetermined threshold, or as support that is provided to control the speed of the vehicle when the vehicle passes by the target in a case where the sensitivity index value is lower than the predetermined threshold; and executing the support to control the distance in the lateral direction or the support to control the speed of the vehicle;

wherein the calculating step calculates the sensitivity index value of the driver based on a distance between the vehicle and the target in a front-rear direction, a sense of the driver regarding the distance in the front-rear direction, a distance between the vehicle and the target in a lateral direction, a sense of the driver regarding the distance in the lateral direction, a speed of the vehicle, a speed of the target, and a sense of the driver regarding the speed.

5. A non-transitory storage medium storing a program executed by a computer in a driving support device for a vehicle, the program comprising:

a step of calculating a sensitivity index value for avoiding a target that is at risk of collision, based on a driving operation content of a driver of the vehicle;

a step of determining a driving support method to be applied to the vehicle as support that is provided to control the distance in the lateral direction between the vehicle and the target when the vehicle passes the target, in a case where the sensitivity index value calculated by the processor is higher than a predetermined threshold, or as support that is provided to control the speed of the vehicle when the vehicle passes by the target in a case where the sensitivity index value is lower than the predetermined threshold; and a step of executing the support to control the distance in the lateral direction or the support to control the speed of the vehicle;

wherein the step of calculating calculates the sensitivity index value of the driver based on a distance between the vehicle and the target in a front-rear direction, a sense of the driver regarding the distance in the front-rear direction, a distance between the vehicle and the target in a lateral direction, a sense of the driver regarding the distance in the lateral direction, a speed of the vehicle, a speed of the target, and a sense of the driver regarding the speed.

6. A vehicle equipped with the driving support device according to claim 1.

* * * * *